United States Patent [19]
Chauffour et al.

[11] Patent Number: 5,870,397
[45] Date of Patent: Feb. 9, 1999

[54] METHOD AND A SYSTEM FOR SILENCE REMOVAL IN A VOICE SIGNAL TRANSPORTED THROUGH A COMMUNICATION NETWORK

[75] Inventors: Pascal Chauffour, Saint-Laurent-du-Var; Bernard Pucci, Cagnes sur Mer; Gerard Richter, Saint Jeannet; Maurice Duault, Saint Laurent du Var, all of France

[73] Assignee: International Business Machines Corporation, Armonk, N.Y.

[21] Appl. No.: 695,280

[22] Filed: Aug. 6, 1996

[51] Int. Cl.⁶ ........................................... H04T 3/17
[52] U.S. Cl. ........................................... 370/435; 370/528
[58] Field of Search ........................................... 370/386, 389, 370/433, 434, 435, 437, 442, 458, 459, 461, 465, 490, 498, 528, 468, 522; 704/219

[56] References Cited

U.S. PATENT DOCUMENTS

| | | | |
|---|---|---|---|
| 4,503,533 | 3/1985 | Tobagi et al. | 370/445 |
| 5,220,565 | 6/1993 | Wilson et al. | 370/349 |
| 5,526,353 | 6/1996 | Henley et al. | 370/392 |
| 5,615,214 | 3/1997 | Chandos et al. | 370/349 |
| 5,673,268 | 9/1997 | Sharma et al. | 370/522 |

*Primary Examiner*—Douglas W. Olms
*Assistant Examiner*—Seema S. Rao
*Attorney, Agent, or Firm*—Gerald R. Woods

[57] ABSTRACT

A method and an apparatus for removing the silence from the digitalized voice signals conveyed through packets or cells switching networks. The silence samples are neither packetized nor sent over the network but are regenerated at the output of the network. The silence samples generated are white noise samples, where the level is adapted to the background noise of the silence samples received at the input node of the network. For long periods of silence, the white noise level is periodically refreshed to be adapted to the last silence samples received at the input node of the network. The method provides also a control of packet or cell loss. The method uses are not control packets; in the later case, it can be used for ATM networks with AAL1. The method is implemented as a program executed in a Digital Signal Processor located on adapter cards dedicated to voice processing in the network access nodes.

9 Claims, 9 Drawing Sheets

METHOD AND A SYSTEM FOR SILENCE REMOVAL IN A VOICE SIGNAL TRANSPORTED THROUGH A COMMUNICATION NETWORK

FIELD OF THE INVENTION

This invention deals with transport of voice information in packets or cells switching networks such as Frame Relay or ATM (Asynchronous Transfer Mode) networks and particularly with the function of silence removal.

BACKGROUND OF THE INVENTION

In digital networks, voice is encoded with a PCM (Pulse Code Modulation) coding system which provides a constant bit rate of 64 Kbits per second. This bit rate corresponds to the sampling of the voice analog signal at the rate of 8,000 times per second, each sample being represented by 8 bits. In order to transport this voice signal across a packet or cell network, individual 8 bits samples are assembled into packets.

Packetized systems exploit the bursty nature of voice and data traffic to multiplex the traffic of several users so that they can share transmission bandwidth and switching resources. Packet header includes the necessary control information allowing a wide range of coding schemes for voice and data and thus easy integration of multimedia traffic (voice, video and data). The 'packet networks' considered for the present invention are either packet based such as Frame Relay or cells based such as Asynchronous Transfer Mode (ATM) networks.

One way of saving bandwidth is to reduce the bit rate required from the 64 Kbps standard rate. Adaptive Differential PCM (ADPCM) is a compression algorithm reducing the bit rate to 32 Kbps without measurable loss of quality: it encodes each sample as the difference between it and the last sample, rather than as an absolute amplitude value. Voice compression principle relies on the fact that a voice signal has considerable redundancy; which means that the general characteristics of the next few samples can be predicted from the last few samples. The Global System for Mobile Communications (GSM) standard for European Cellular Telecommunications System is one example of compression algorithm. As well as saving bandwidth, the compression algorithm must be good indeed in term of quality, which means that a listener must not detect the difference between an original analog signal and one that has been encoded and later decoded.

Speech occurs in 'talk spurts' and is basically half-duplex (since of the time only one person is talking). Sixty percent of any (one way) voice conversation consists of silence. Another way of saving bandwidth is to see when there is no actual speech and just stop sending voice samples during the gaps. This silence removal function consists in detecting silence and stopping sending of voice packets at the originating end and generating a background noise instead of silence at the terminating end. It is of a better comfort to generate a background noise instead of silence to minimize the discontinuity between the background noise between speech and silence. Careful selection of the noise power is necessary to avoid the problem of the 'noise pumping', an annoying contrast between the background noise during the silence period and the background noise during speech spurts.

Most of the so called comfort noise generators take into account the quality requirement for the choice of the noise power. The GSM standard for digital cellular telecommunications provides imbedded in its compression algorithm a comfort noise generator. The parameters of the comfort noise are estimated on the transmit side and transmitted to the receive side before the radio transmission is cut and at a regular low rate afterwards. This allows the comfort noise to adapt to the changes of the noise on the transmit side. The comfort noise generated is a good quality but this generator can only be used with the GSM coding scheme for compression algorithm: it cannot be used to add a 'comfort noise generator' to other voice coding algorithms such as PCM (no compression), ADPCM, SBC, and CELP.

The standard G.764 is a Voice Packetization Protocol of CCITT which has been defined to operate with any voice compression algorithm. In order to play out at the terminating end a background noise, the level of noise is specified in a 4-bit field of the packet header. An additional bit called as more (M) bit is used to distinguish between gaps due to silence and gaps due to missing/discarded cells or packets. This solution provides a comfort noise of good quality, is independent of the compression algorithm but implies a 5 bits overhead on each packet or cell transported. When used with ATM cells, the additional 5 bits for voice header cannot be protected with the ATM Adaptation Layer of type 1 (AAL1). Thus, the Adaptation Layer of type 2 (AAL2) which is intended for variable-rate information or AAL5 need to be used. Now, there are two disadvantages related to the use of AAL2 or AAL5 for ATM, because AAL2 is not yet full defined by international standards and AAL5 implies using a large overhead.

It is an object of the present invention to provide a method and a system for silence removal independent from the voice coding or voice compression algorithms.

Another object of the present invention is to provide a method and a system for silence removal which can be used in ATM networks and is compatible with the ATM adaptation layer of type one (AAL1).

It is another object of the present invention to provide such a method and system wherein the overhead on the packets or cells is minimized, while offering, a good quality in terms of comfort during speech.

The method according to the present invention for transporting a stream of packets between a transmitting side and a receiving side through a communication network, said stream including voice packets corresponding to speech periods and silence packets corresponding to silence periods, comprises: at the transmitting side, detecting the ends of speech periods and transmitting only the voice packets corresponding to the speech periods followed by the silence packets following the speech periods for a first period time, and at the receiving side, reconstituting said stream by interleaving between the voice packets received from the transmitting side, white noise packets corresponding to background noise of the preceding voice packets.

In a first embodiment it comprises:
at the transmitting side:
  detecting the end of speech periods,
  transmitting the silence packets during the first period of time after the end of speech periods,
  calculating at the end of speech periods, a white noise level corresponding to the background noise of at least one preceding packet,
  transmitting to the receiving side, a control packet including said white noise level,
at the receiving side:
  receiving the voice, silence and control packets,
  reading the white noise level in the control packet to generate the white noise packets which are interleaved between the voice packets received from the transmitting side.

In a second embodiment it comprises:
at the transmitting side:
  detecting the end of speech periods,
  transmitting the silence packets during the first period of time after the end of speech periods,
at receiving side:
  detecting the end of speech periods in the received packets,
  calculating a white noise level from the background noise of at least the last one received packets, and generating the white noise packets to be interleaved between the voice packets which are received from the transmitting side.

The silence removal function of the invention is independent of the voice coding for ATM networks and with a minimal dependence for non-ATM (Asynchronous Transfer Mode) networks which is limited to the characterization of the control packet versus the ordinary voice samples packets. As required, there is no overhead on each packet transported in the network as with the prior art: for non ATM cells, only one control packet is sent by the transmitting side; for ATM networks, there is no overhead on each packet transported in the network and AAL1 can be used. A packet loss control mechanism is also implemented. Moreover, the processing resources used for the silence removal function of the present invention is very low compared to the those necessary for the compression algorithm.

In the preferred embodiment of the invention the silence removal method is implemented by a Digital Signal Processor. A Voice Activity Detector (VAD) function is used to detect the silence packets of the input voice packets stream. In the telecommunications network access nodes, both the voice compression and the silence removal functions may be implemented in voice dedicated adapters cards which include also the adapter usual routing functions.

DETAILED DESCRIPTION OF THE PREFERRED EMBODIMENT

Figure 1:
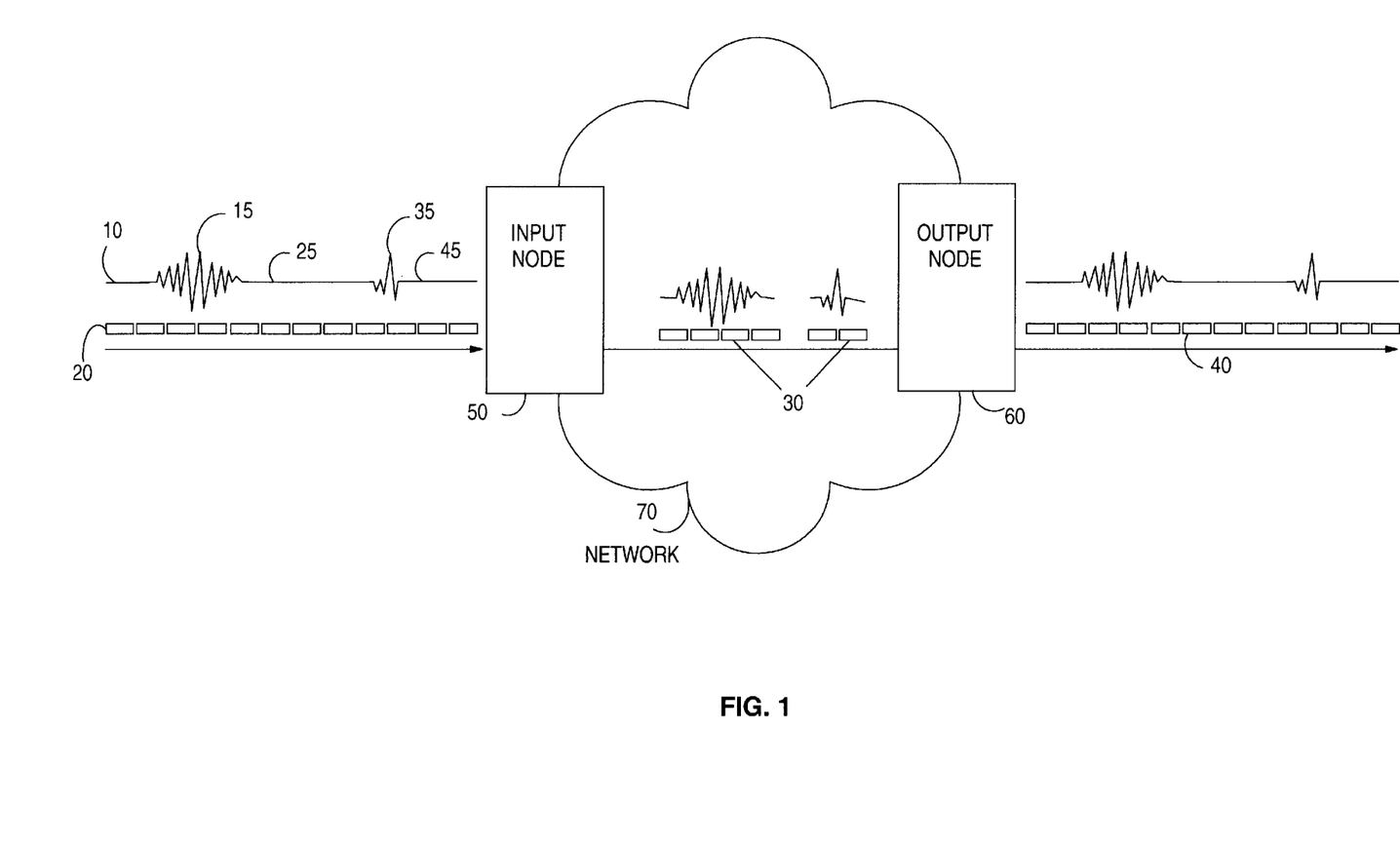
FIG. 1 shows the voice signal. and the corresponding samples voice stream transported by the packet or cell network.

In FIG. 1 are represented both the voice signal (10) and the corresponding stream of voice packets (20, 40) entering a packet or cell communication network (70) via an input telecommunications access node (50) so called the packet transmitting side and generated by the output telecommunications access node (60) so called the packet receiving side and the network packets (30) transported through the network. The voice samples packets (20) enter the network at a constant bit rate of 64 Kbps in the PCM mode. Optionally, in the input node 50, the voice samples are compressed and decompressed at the output node (60). As the voice signal is a succession of speeches (15, 35) and silences (25, 45), the voice samples packets convey corresponding high level samples so called 'speech samples' and lower level, background noise samples so called 'silence samples'. It is the general object of the silence removal function in the access nodes (50 and 60) not to send network packets for silence samples at the input of the network (50) as well as regenerating those silence samples at the output of the network (60).

Figure 2:
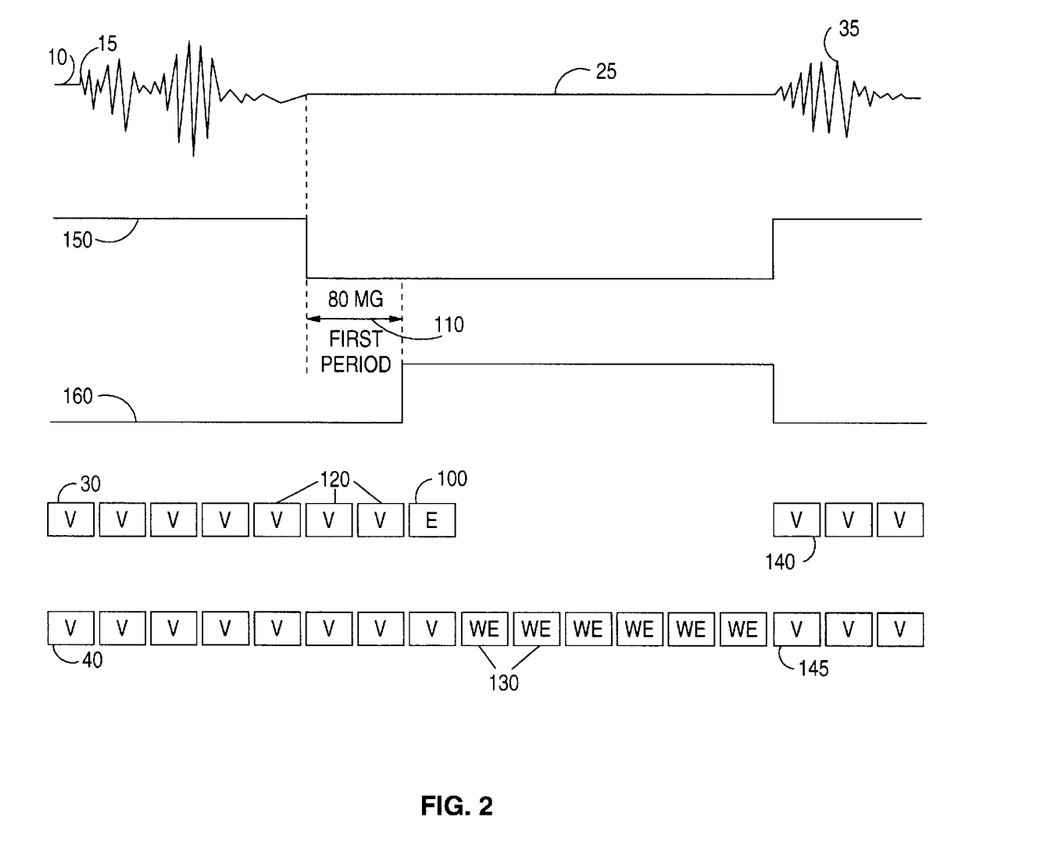
FIG. 2 describes the comfort noise generated during silence between two speeches.

FIG. 2 describes the solution of the present invention for silence removal in a normal processing mode. The voice signal 10 comprising speech and silence signals (15, 25) is coded into voice samples packets (20) when entering the network. The state of the silence removal operation is a 'speech state on' (150) until a silence is detected by a Voice Activity Detection function. At the packet transmitting side of the network (input node 50), when the silence is detected by the Voice Activity Detection function (VAD), the transmission goes on with the first silence samples (120) of the network packets (30), during a defined short first period of time (110) set at 80 ms (for GSM packets it corresponds to 4 packets as one packet takes 20 ms). This period of time is chosen so as to be sufficient to analyze the level of the background noise of the silence samples. At the end of the period of 80 ms, the state of silence removal operation is 'silence state on' (160). The voice samples packets (40) being generated out of the network by node (60) during speech only comprises the voice packets as received in input. After the period of 80 ms, and during the period of silence, white noise samples (130) are generated at a level corresponding to the background noise calculated during the defined period of time mentioned above. When speech restarts (35) new network voice packets (140) are sent over the network and voice packets (145) are played at the output of the network. The FIG. 2 presents the two possible ways of determining the level of energy E for white noise to be generated:
  either, the calculation is performed by the input node (transmitting packets side): in this case the input node sends a control packet (100) containing the level of white noise generated; at reception of the control packet, the output node is generating the corresponding silence samples (130) with white noise WE corresponding to the level E sent in the control packet;
  either no control packet (100) is sent and the network packets stream sent over the networks stops at the last silence packets (120) of the period of time 110; the output node receiving the network packets at the other side of the network has the capacity (symmetrical to the input noise capacity) to detect end of speech and to calculate the white noise level to be generated. This kind of silence removal embodiment is implemented in ATM networks access nodes. The characterization of the control packet depends on the voice coding: for instance, with the 32 bytes long GSM packets, the first byte being never set to FFFE, this value can be used to characterize a control packet for a GSM coded voice sample stream. The energy level conveyed in this control packet can take the two following bytes. This information is protected in the control packet by redundancy in order to avoid bad adjustment of generated white noise, which means it is repeated on the bytes 3 and 4 and 5 and 6 of the 32 bytes of the GSM packet.

Figure 3:
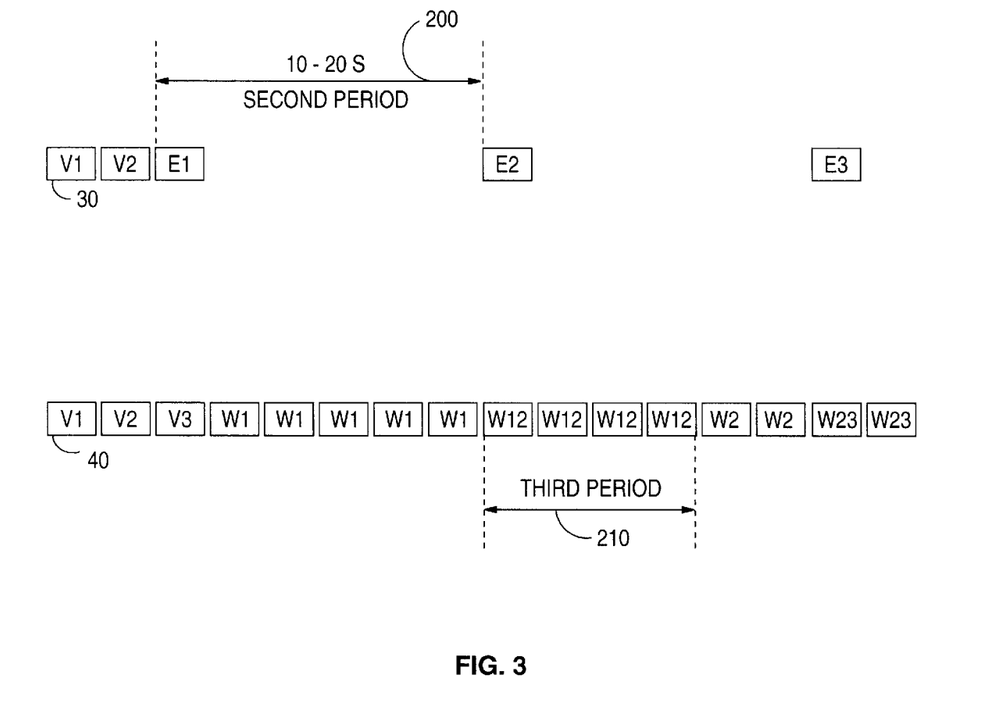
FIG. 3 shows the white noise generation at a level periodically refreshed during silence.

FIG. 3 illustrates the continuous monitoring of the white noise level. A second period of time (200) is defined of 10 to 20s in the preferred embodiment of the invention, at the end of this period, the white noise level of the generated samples packets (40) at the output access node is recalculated from the current voice samples arriving at the input of the network. At the output node, the level of the white noise samples generated is progressively readjusted to the new level value during a third defined period of time (210). In a preferred embodiment of the invention, the third period is set to 80 ms.

The network packets sent over the network represented by 30 in FIG. 3 illustrates the case where the calculation of refreshed white noise level values from the current background noise is performed at the input node and a control packet containing the noise level of energy is sent from the input node; a first control packet is sent when entering a silence (E1), then a second control packet (E2) with the refreshed level is sent after the second defined period of time. As mentioned sooner, the white noise samples generated have a progressive level adjustment from E1 to E2 during the defined third period of time (80 ms and 4 packets); this progressive level adjustment being calculated by the output node.

Optionally if the input node detects that the signal received is still silence and the energy variation of the silence is greater than a threshold value, it sends a control packet (E2) before the end of the second period.

In the case where the input node does not send a control packet, it lets a burst of silence packets crossing the network during already known defined short first period of time (110) set at 80 ms. In FIG. 3, each E packets should be replaced by 4 silence packets. It is up to the receiving node to detect these packets and calculate the new level of noise to be reached by the white noise packets generated at the output of the network. The output node, as with the first case calculates also the linear interpolation to progressively reach the refreshed level of white noise to be generated.

Figure 4:
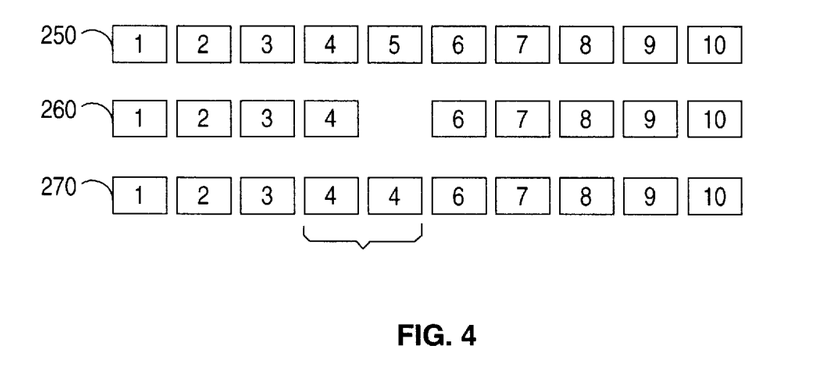
FIG. 4 represents the process implemented when one packet is lost.
Figure 5:
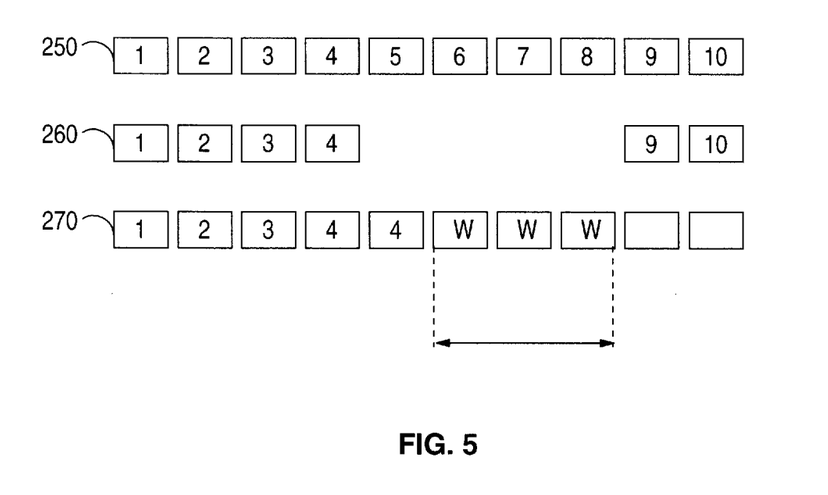
FIG. 5 describes the process implemented when more than one packets are lost.

FIG. 4 and FIG. 5 represent how the packet loss is controlled. This control added to the just seen white noise level monitoring, participates in the quality of the silence removal solution of the present invention. In FIGS. 4 and 5, the three packets streams (250, 260, 270) respectively correspond to the network packets sent over the network by the network input node, the one received by the network output node and the one reconstructed and sent by the network output node. FIG. 4 shows the case where one network packet (4) has been lost when crossing the network: 270 indicates that the output node receiving packets generates the packet 4 in the final output packet stream: this hides the error and optimizes the quality of the restored voice. FIG. 5 illustrates the case where consecutive network packets (more than one) are lost: the preceding network packet (4) will be generated once. After that until the next real packet is received, white noise packets (w) will be generated at a determined level (around −45 db is convenient). Technic of interpolation can be used to smooth the restored voice samples and avoid signal discontinuities.

The preferred embodiment of the present invention is a software implementation of the silence removal function. The detection of speech consisting in reading the input packets and identifying the 'silence packets' or 'speech packets' is performed by a 'Voice Activity Detector' (VAD). Any of the existing VAD algorithms can be used for the silence removal function.

Figure 6:
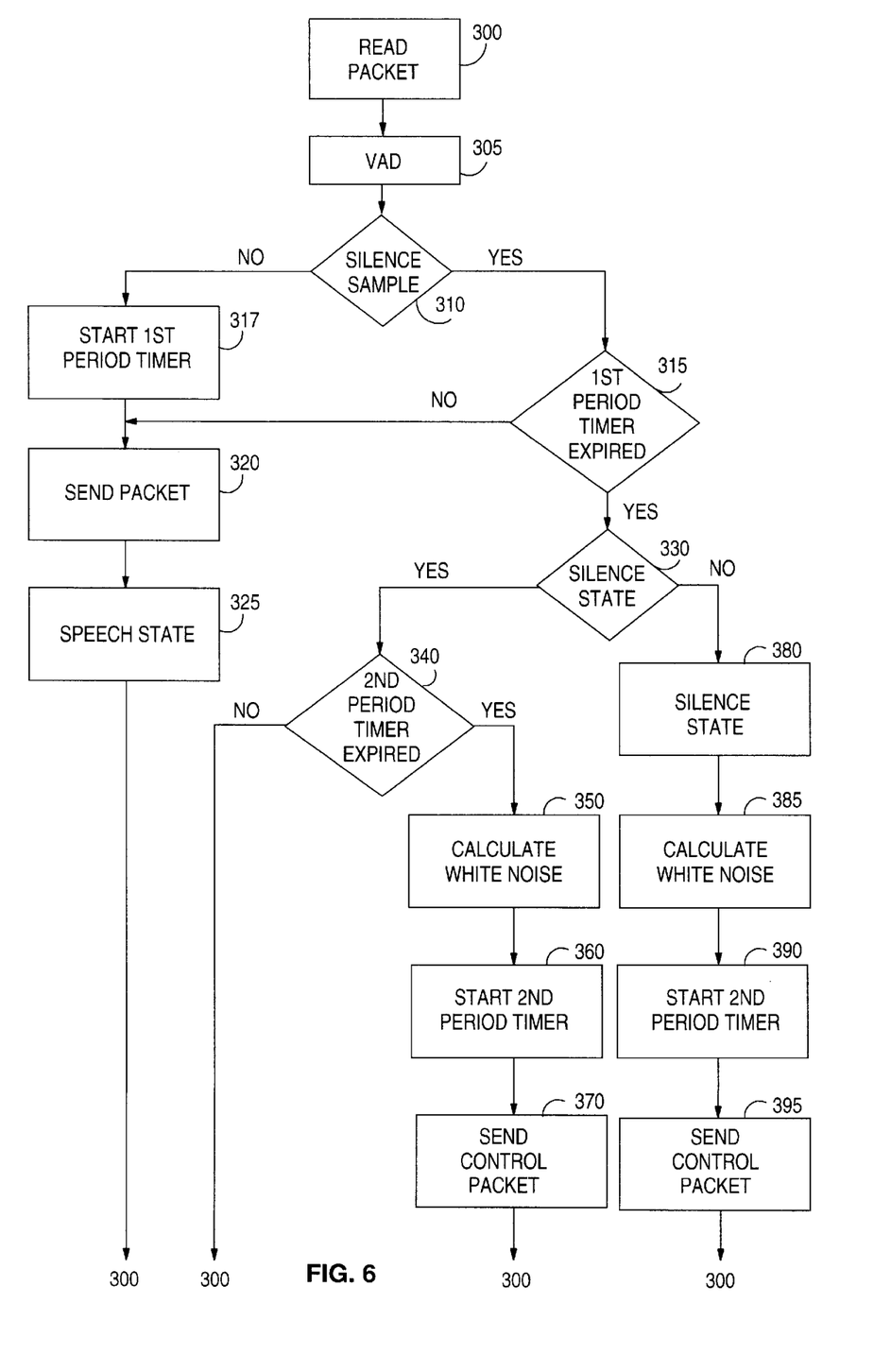
FIG. 6 shows the flow chart of the silence removal function wherein control packets are used at the packet transmitting side of the packet network.

The silence removal function implemented in the input node is described in the case where the method uses control packets, in the flow chart of FIG. 6. The solution of the silence removal function program of the present invention includes also, in the input node, instructions related to white noise level refresh as described in FIG. 3. In the output node, still when the method uses control packet, the silence removal program is run as described in the flow chart of FIG. 7. The white noise refresh level generation instructions of the silence removal function is described in FIG. 3.

Figure 8:
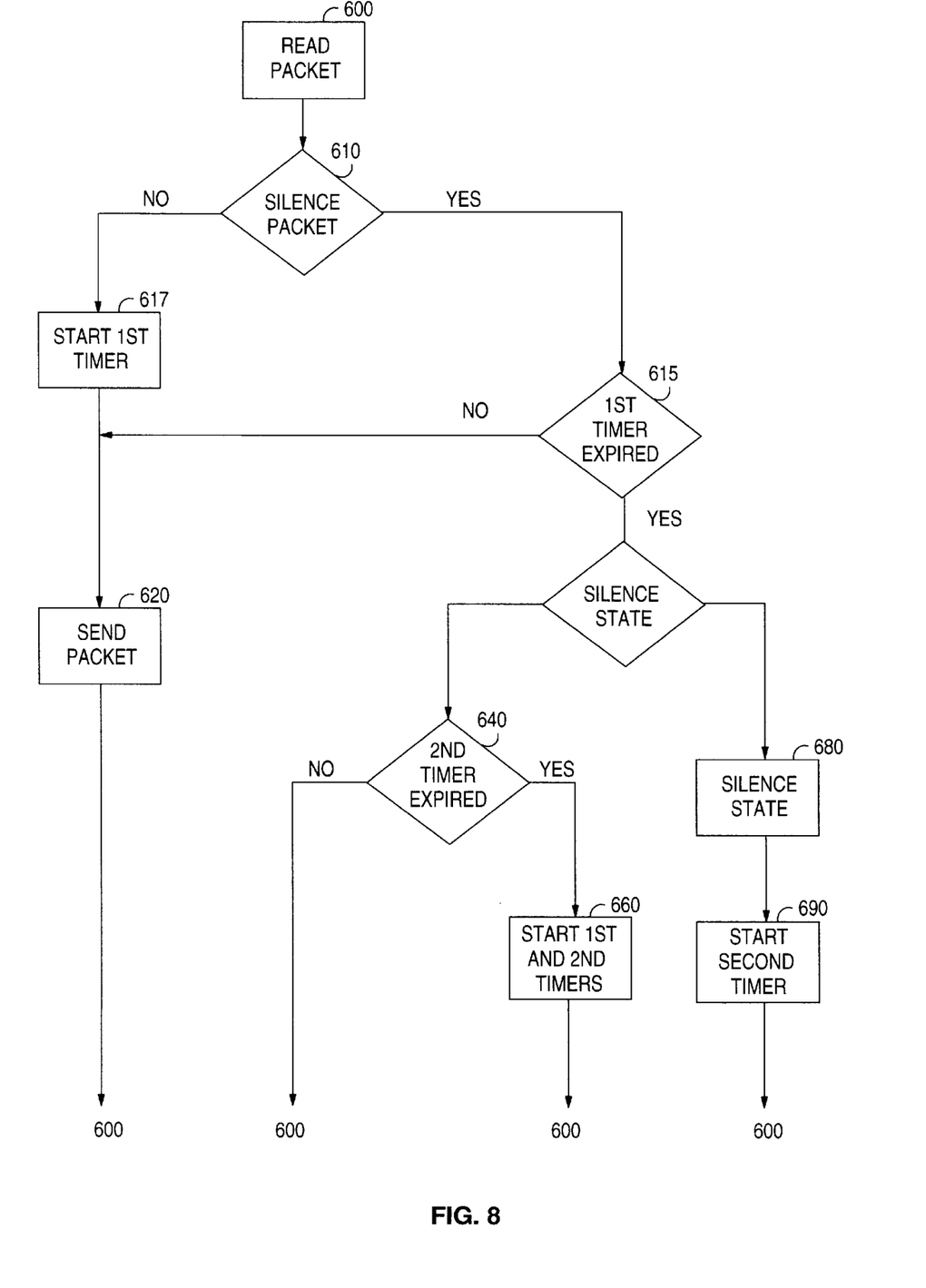
FIG. 8 shows the flow chart of the silence removal function wherein no control packets are used at the packet transmitting side of the packet network.

The silence removal programs operating in the input node in the case where the method does not uses control packets, is described in FIG. 8. The silence removal function programs of the input node include also instructions related to white noise level refresh as described sooner in the description in the comments of FIG. 3. The principle, in the case where the program does not use control packets, is to repeat in the output node the end of speech detection and the white noise level calculation which is implemented in the input node. The silence removal program flow chart of the output node is described in FIG. 9. The program includes also the white noise refresh level generation instructions as described sooner in the comments of FIG. 3.

FIG. 6 is the flow chart of the part of the silence removal function performed in the input network node (the transmitting side) when the control packets are used. This flow chart corresponds to the principle already discussed in the comments of FIGS. 2 and 3. It is noted that there are two possible states: silence state where the silence removal program is run or 'speech state' where the 'normal' voice transport processing applies: this voice processing can, for instance, include a voice compression processing. In 300 the input voice packet arriving on the input line is read and the test 310 is for silence or speech voice sample detection. This test is performed by the VAD function. If the packet received is a silence packet (branch YES), the following test 315 is run for defining if it is a silence packet corresponding to a first timer period (110) of FIG. 2 or if said first period timer has expired (branch YES). On branch YES, 330 is for testing if the packet read is a first silence packet or if the state was already a 'silence state'. If the state was already a 'silence state' (YES branch), the end of defined second period of time timer (200) is checked (340). As explained in the comments of FIG. 3 the second period of time corresponds to the white noise level refresh principle. If the second period timer is expired, (YES branch), this means that the level of white noise which is generated at the output of the network during silence state needs to be refreshed; thus, a control packet is prepared and sent: the new white noise level is calculated from the background noise of the last silent voice packet received; the white noise level calculated is included in a control packet (350). The control packet format depends on the voice coding. The second period of time timer is started (360); a control packet including the new level of white noise is sent over the network by the input node (370) and the next sample is read (300). In test 340, if second period of time is not expired, (NO branch), the next packet is read (300). If the answer to test 330 is NO, this means that the silence packet received is a first silence packet received after a speech state and the silence state is entered (380); the new white noise level is calculated (385) from the background noise of the last voice packet received; a second period of time is started (390); a control packet including the new level of white noise is sent over the network by the input node (395) and the next packet is read (300). If, after test 310 we know that the packet received is a speech packet, the first period timer is started (317) to prepare the case where this speech packet is the last one before end of speech (step unused in the other cases). Then, the packet read is sent over the network (320). At this step, voice processing can optionally include a step of voice compression; the voice state is entered (or confirmed) (325) and the next packet is read (300).

Figure 7:
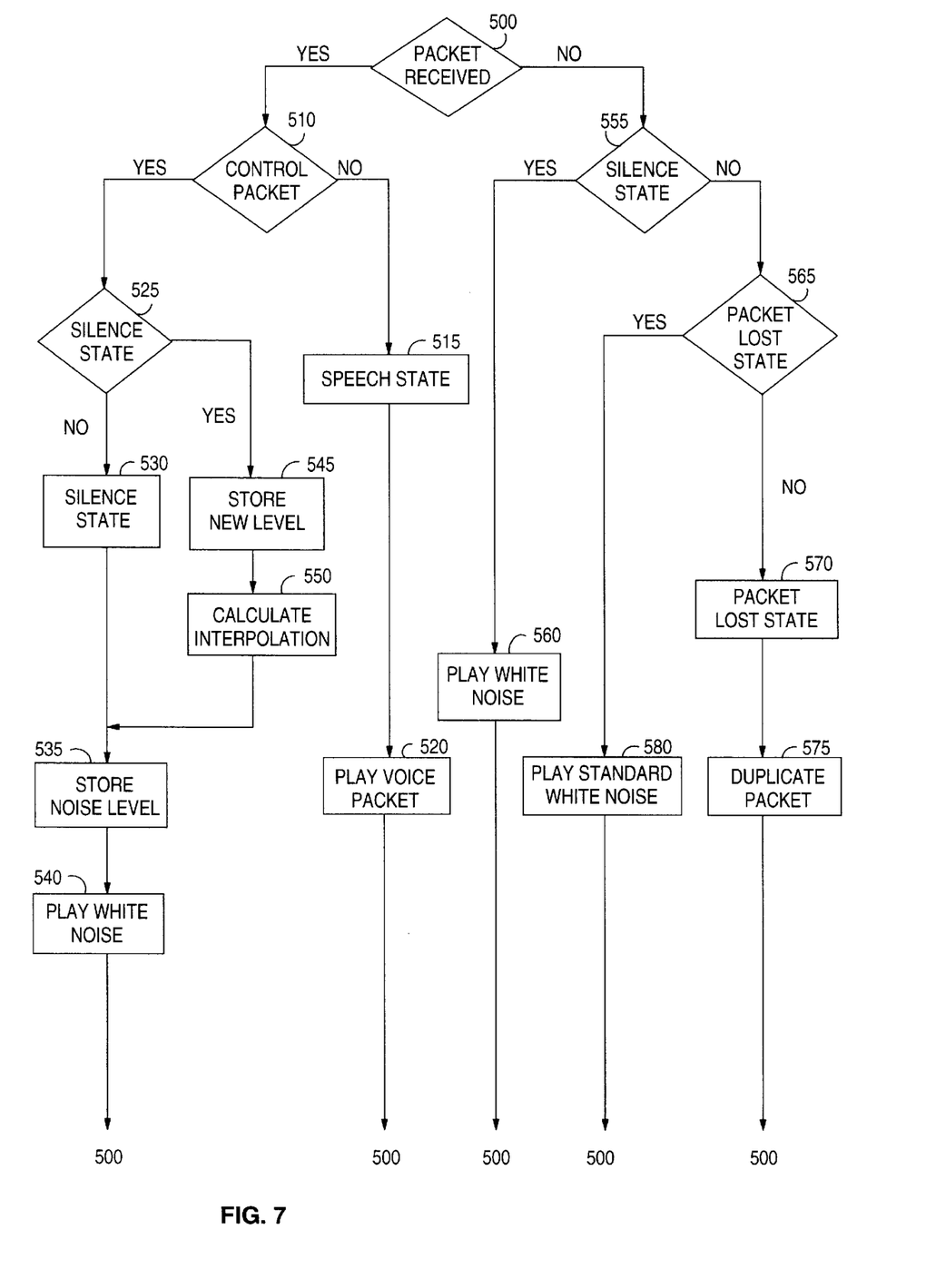
FIG. 7 shows the flow chart of the silence removal function wherein control packets are used at the packet receiving side of the network.

FIG. 7 is the flow chart of the part of the silence removal program located in the output network node (the receiving side) when control packets are used. This flow chart corresponds to the principle explained sooner in FIGS. 2, 3, 4 and 5. It is noted that in the output node, three states are possible: speech, silence or 'packet lost' states. In the output node when a packet is received (test 500 YES branch), it is tested if it is or not a control packet (test 510). If it is not a control packet, this means that it is a speech voice packet; the speech state in entered (or confirmed) (515) and the voice packet is played on the output line (520) by the output program. Optionally, voice processing system can include at this step a step of voice decompression. The next packet is read (500). If the answer to test 510 is yes, this means that a control packet has been received. The silence state is then tested (525) and if the answer is no, this means that this control packet is to advise of a silence in the voice signal: the silence state is entered (530) and the noise level read in the packet is stored (535) and played in the output line in a white noise sample (540), the next packet is read (500). If the answer to test 525 is YES, this means that this control packet is to refresh white noise level samples played by the output node; the new noise level is then stored (545) and the another noise level is calculated (550): it is calculated with a linear interpolation algorithm to have a progressive upgrade of the white noise level when it has been refreshed; with this algorithm, the progressive levels are calculated to reach the refreshed value on a given period of time (said third defined period of time); the process goes on with step 535. If the answer of test 500 is NO, this means that no packet has been received: the state is tested (555) if the state is silence state, this means that a white noise packet has to be generated and played at a level coming either form interpolation or just the value read in the last control packet; the packet is played on the output line (560) before reading the next packet (500). If the state is not silence state (branch NO of test 555), and if the state is not packet lost (branch NO of test 565), this means that a speech packet should have been received and that a first packet is lost: the state 'packet lost' is set and the previous packet is duplicated and played on the output line (575) before reading the next packet (500). If the answer of test 565 is YES, this means that it is not the first packet lost and a white noise packet is generated and played at a given level (45 db is convenient) (580) before reading the next packet (500).

FIG. 8 is the flow chart of the part of the silence removal program located in the input network node (the transmitting side) when the control packets are not used: this is the case of ATM networks when using AAL1. This flow chart corresponds to the principle already discussed in the comments of FIGS. 2 and 3. In 600 the input packet is read and the test 610 is for silence or voice detection, this is performed by the VAD. If the packet received is a silence packet (branch YES), the following test 615 is run for defining if it is a silence packet corresponding to the first timer period (110) of FIG. 2 or if said first period timer has expired (branch YES). If YES, (630) is for testing if the packet read is a first silence packet (branch NO), or if the state was already a silence state (branch YES): if no, the silence state is entered (680) and a second timer is started (690). If yes, it is tested at 640 if the second timer has expired. If it has expired, first and second timers are started 660, and the process is resumed at 600, so that a burst of silence packets will be send at step 620. If the timer has not expired, the process is resumed at 600.

If test 610 answer is NO, we know that the packet received is a voice packet, the first period timer is started (617) to prepare the case where this voice packet is the last one before end of speech (step unused in the other cases). Then, the packet read is packetized and sent over the network (620); at this step, voice processing can optionally include a step of voice compression; the next packet is then read (600).

Figure 9:
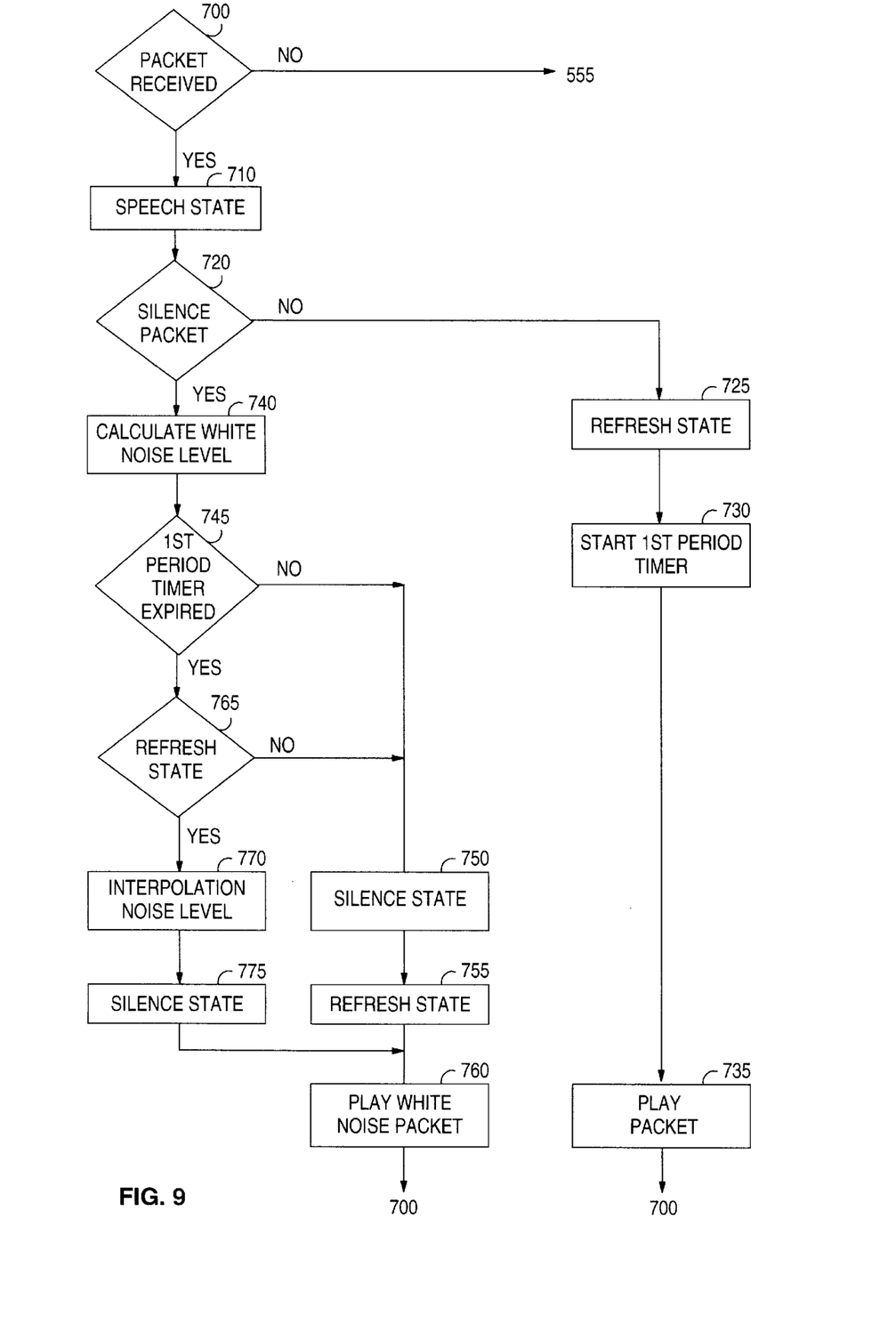
FIG. 9 shows the flow chart of the silence removal function wherein no control packets are used at the packet receiving side of the packet network.

FIG. 9 is the flow chart of the part of the silence removal program located in the output network node (the receiving side) when control packets are not used: this is the case of ATM networks, when AAL1 protocol is used. This flow chart corresponds to the principle explained sooner in FIGS. 2 and 3. It is noted that in the output node, four states are possible: speech, silence, 'refresh white noise' or 'packet lost' states. In the output node if no packet is received (test 700 NO branch), the process goes on with the step 555 in flow chart of FIG. 7. The only difference is that the white noise level of the white noise packet played on the output line (560) has not been read in a control packet sent by the input node but has been calculated in the output node. If the answer to test 700 is YES, this means one packet has been received, the speech state is then set (710). At this step the voice processing can optionally include a step of voice decompression. It is then tested if the packet is a silence packet or not (720). If NO, the 'white noise refresh' state is set (725) and a first period timer is set (730) to prepare the burst of packets which will be used to calculate the white noise level. Then the packet is played by the output node (735) and the next packet is read (700). If the answer to test 720 is YES, this means that a silence packet has been read and the white noise level is calculated (740); if the first period timer has not yet expired (branch NO of test 745), the silence state is set (750) and the refresh white noise level state is simultaneously set (755); then a white noise packet with the white noise level calculated is sent by the output node (760); then, next packet is waited for in 700. If the answer to the test 745 is YES, this means that the first period timer has expired and if the 'refresh' state is set (branch YES of test (765), a new white noise level is calculated (770) with a chosen linear interpolation algorithm (many are possible); then, the silence state is set (775) and the white noise sample is played (760). If the answer to test 755 is NO, this means that the refresh state is not set and thus, the white noise level has not to be interpolated before generating and playing the white noise packet (760). In the output node if no packet is received (test 700 NO branch), the process goes on with the step 555 in flow chart of FIG. 7. The only difference is that the white noise level of the white noise packet played by the output node (560) has not been read in a control packet sent by the input node but has been calculated (step 740) in the output node.

Figure 10:
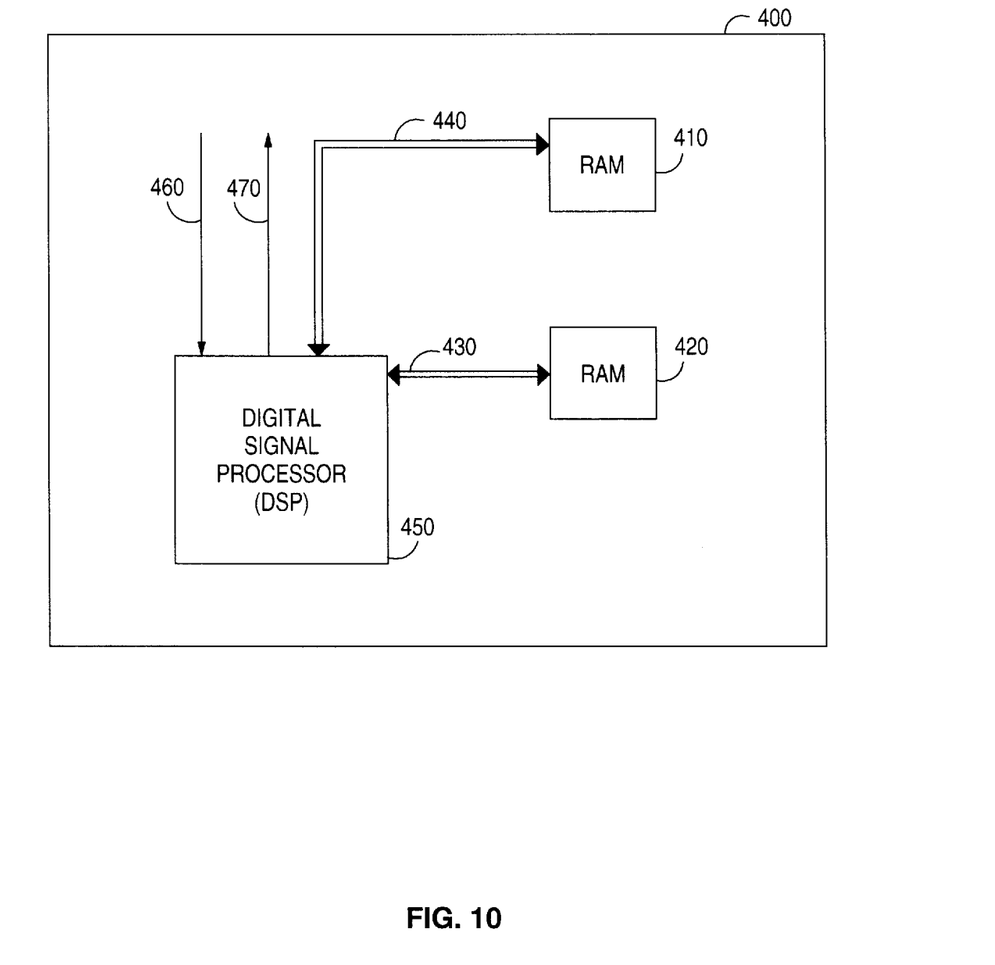
FIG. 10 illustrates the implementation of the silence removal function as a program running in an adapter card of a telecommunications access node dedicated to voice processing.

The implementation in the telecommunications access nodes of the processing functions such as voice compression, is done on a dedicated voice traffic adapter card. FIG. 10 illustrates the components related to silence removal in the dedicated voice processing adapter card (400): the program instructions are stored in a first RAM storage unit (410) and are read via the bus 440, by a Digital Signal Processor (450) or a pool of DSPs, which stores for instruction execution the data in a second RAM storage unit 420 which it accesses through the bus 430. Input voice packets are arriving in the DSP through the input serial link 460 and are sent out through the output serial link 470. The DSP 450 can be used also on the voice dedicated adapter card to run the voice compression algorithms. The adapter card contains also the components for the usual routing functions of an adapter card. The input and output serial links (460,470) being the means to communicate with these components.

We claim:

1. A method for transporting a stream of packets between a transmitting side and receiving side through a communication network, said stream including voice packets corresponding to detected speech periods and silence packets corresponding to detected silence periods, characterized in that it comprises:

at the transmitting side, detecting the ends of speech periods, transmitting voice packets corresponding to the speech periods followed, for a first period of time after the end of each speech period, by silence packets, calculating following the end of a speech period, a white noise level corresponding to the background noise of at least one following silence packet and transmitting to the receiving side, a control packet including said white noise level, at the receiving side, receiving the voice, silence and control packets, reading the white noise level in the control packet, and reconstituting said stream by interleaving between the voice packets received from the transmitting side, received white noise packets.

2. The method according to claim 1 characterized in that it comprises at the receiving side:

if no packet is received and if the last received packet is not a control packet, repeating in the packet stream reconstituted by the receiving side, the last received packet at least once.

3. The method according to claim 1 characterized in that it comprises at the receiving side:

if no packet is received and no end of speech is detected, repeating in the packet stream reconstituted by the receiving side, the last received packet at least once.

4. The method according to claim 2, characterized in that it comprises at the transmitting side, starting a timer having a second period of time at the end of the first period, when the timer is expired and if no voice packets are to be transmitted, calculating a new white noise level corresponding to the background noise of silence period and sending a new corresponding control packet which is used by the receiving side for generating refreshed white noise packets.

5. The method according to claim 3 characterized in that it comprises:

at the transmitting side:

starting a timer having a second period of time at the end of the first period, when the timer is expired and if no voice packets are to be transmitted, sending a burst of silence packets and at the receiving side, receiving the burst of silence packets and calculating a new white noise level which is used for generating refreshed white noise packets.

6. The method according to any one of claim 5, characterized in that it comprises:

calculating with a linear interpolation algorithm and for a third period of time, the progressive values of the next white noise packets to be generated.

7. A system for transporting a stream of packets between a transmitting side and a receiving side through a communication network, said stream including voice packets corresponding to speech periods and silence packets corresponding to silence periods, said system comprising:

a transmission system including a voice activity detector for detecting voice periods and silence periods, control logic for transmitting voice packets representing voice periods and, for a first period of time following the end of voice packets, silence packets representing silence periods following the represented voice periods, a background noise calculator for calculating, following the end of a voice period, a white noise level corresponding to the background noise of one or more of the silence packets representing the silence period following the voice period, a control packet generator for generating control packets including the white noise level, and a transmitter for transmitting voice packets, silence packets and control packets to a receiver system; and a receiver system including:

receiver circuitry for receiving transmitted voice, silence and control packets, background noise logic for receiving white noise level values carried in received control packets and for generating white noise level packets, and signal reassembly logic for reconstituting voice activity detected at the transmission system by interleaving generated white noise packets with received voice packets.

8. For use in a communications network carrying a stream of packets representing voice activity, a transmission system comprising:

a voice activity detector for detecting voice periods and silence periods;

a packet generator for generating voice packets representing periods of detected voice and silence packets representing periods of detected silence;

control logic for transmitting voice packets and, for a first period of time following the end of voice packets, silence packets;

a background noise calculator for calculating following the end of a voice period, a white noise level corresponding to the background noise of one or more of the silence packets representing the silence period following the voice period;

a control packet generator for generating one or more control packets carrying the calculated white noise level; and a transmitter for transmitting voice packets, silence packets and control packets into the communications network.

9. For use in a voice communications network, a method of generating a stream of packets representing voice activity, said method comprising the steps of:

detecting periods of speech and periods of silence;

generating voice packets representing periods of detected speech and silence packets representing periods of detected silence;

transmitting generated voice packets and, for a first period of time following the end of voice packets, generated silence packets;

calculating following the end of the voice packets, a white noise level corresponding to the background noise of one or more of the silence packets representing the period of silence following the period of voice activity;

generating one or more control packets carrying the calculated white noise level; and transmitting voice packets, silence packets and control packets into the voice communication network.

* * * * *